Dec. 15, 1959     R. G. STEVENSON     2,916,913
SOIL BEARING MEASURING DEVICE
Filed Oct. 26, 1955     2 Sheets-Sheet 1

INVENTOR.
ROBERT GROGAN STEVENSON

BY Robt O. Spindle

ATTORNEY

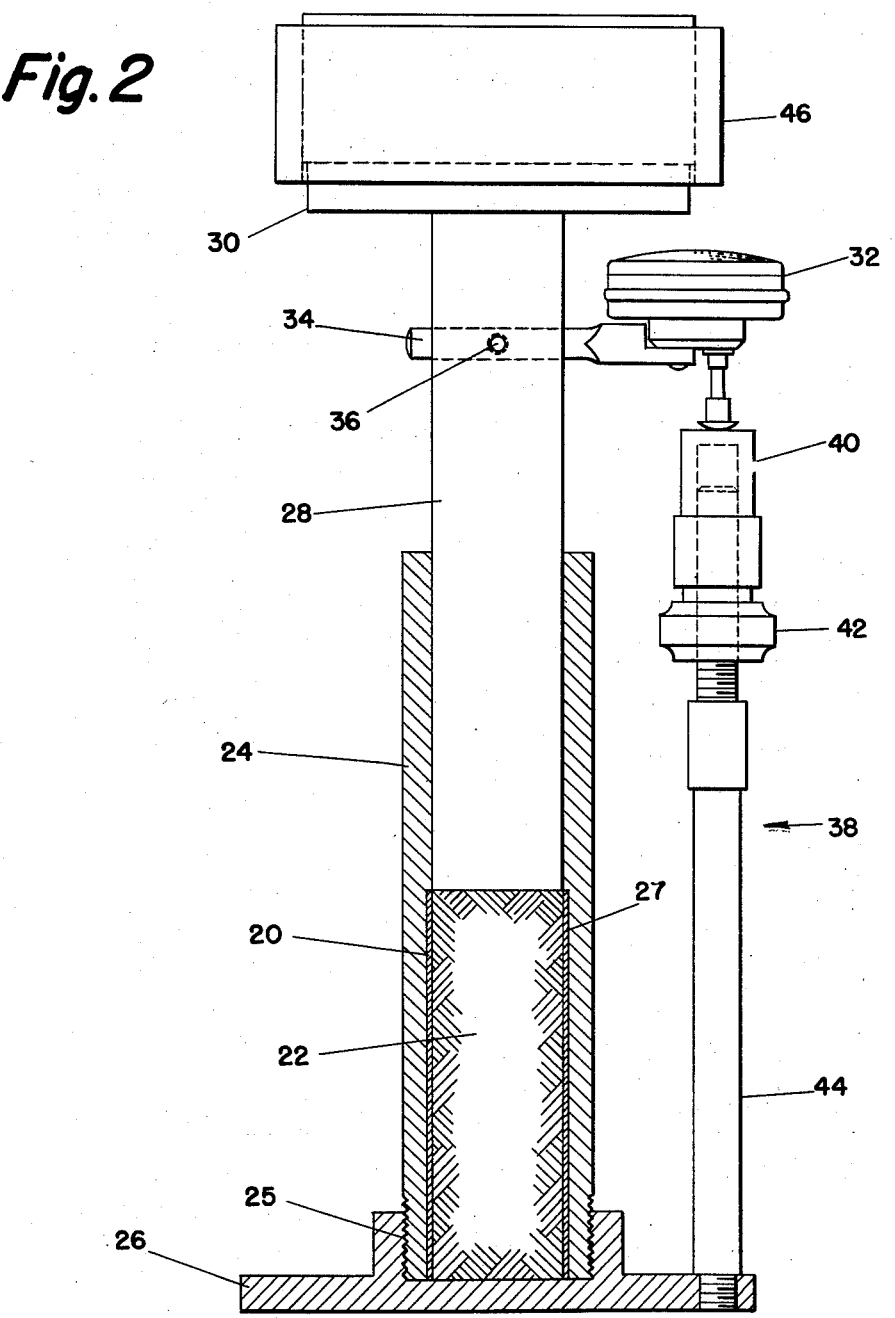

2,916,913
SOIL BEARING MEASURING DEVICE

Robert Grogan Stevenson, Wallingford, Pa., assignor to Sun Oil Company, Philadelphia, Pa., a corporation of New Jersey Application October 26, 1955, Serial No. 542,802

2 Claims. (Cl. 73—94)

The present invention relates generally to a method and apparatus for testing the bearing strength of soils, and more particularly to a method and apparatus for augmenting strength data as determined by other means, as by spot testing at the site.

Before placing foundations for structures, it is necessary to know the supporting strength of the soil on which the structure will stand. Once determined, the form and dimensions of the foundation are decided and the structure started. Due to the wide variations in the earth constituents and the great changes due to moisture and compactness, the bearing strength of the soil can and does vary widely within limited areas. Consequently, tests of borings made in the laboratory, or bearing tests made adjacent a given location, may not indicate the supporting power of the earth at a nearby point. It is, therefore, the primary object of this invention to provide a method and apparatus for field testing the bearing strength of soil for structural purposes in selected areas.

Actual physical loading of soil to test its supporting power is probably the best known method of arriving at an answer. Such practice requires the application of large weights at a selected spot and constant, accurate checks with surveying instruments. To repeat this procedure many times over a given area is prohibitive from the views of both costs and labor. Yet one or two tests of this type cannot give the necessary full and complete data so often required.

Laboratory tests, used alone or in conjunction with actual physical bearing tests, do not give all the necessary data. Nor is this data free of question as to its accuracy. Samples are taken, often with a core spoon or core drill, separated into small sections, and sent to a laboratory. Cost of the operation prevents taking very many samples in any one area. These samples are subjected to crushing forces and these forces measured. Due to handling, lapse of time and change of environment, the sample is not truly representative of the actual condition. It is, therefore, a further object of this invention to provide a method and apparatus for testing the supporting strength of the soil in conjunction with other testing means in adjacent areas.

Another object is to provide a method and apparatus for testing the supporting strength of soil under the actual conditions of moisture content, internal stress and unchanged chemical structure.

Yet another object is to provide a method and apparatus for testing the supporting strength of soil at selected sites which is less expensive and faster than known procedures.

The method of this invention, and the disclosed apparatus shown here, involves the removal of a sample of soil from the selected area in a manner to retain the natural characteristics thereof. By subjecting this soil specimen immediately to graduated pressures and measuring the effect thereof, the supporting strength of the soil at a specific location can be ascertained.

Where used in cooperation with the physical loading and laboratory tests noted above, test specimens can be removed from the immediate areas of these tests and some degree of comparison obtained. The result is then quotable as a comparison with those tests.

From this brief description of the invention, and the noted objects above, further objects and advantages will be apparent as the description proceeds. A better understanding of the invention will be gained by consideration of the further description taken together with the accompanying drawings, in which:

Figure 2 is an elevational view of the field testing device partly in section.

Figure 1:
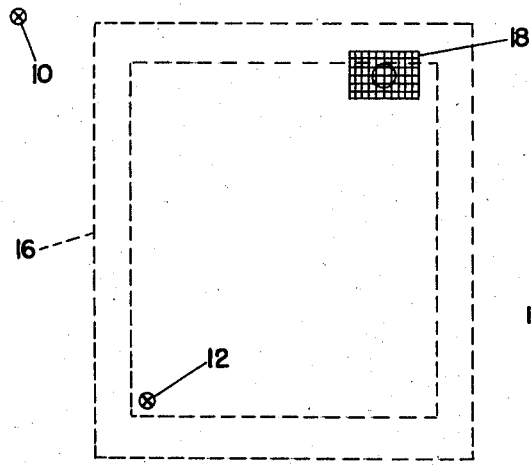
Figure 1 is a plan view of proposed structural footings relative to soil bearing tests.

Referring to Figure 1 of the drawings, three core drillings, 10, 12 and 14, are shown in relation to a tentative location of a foundation 16 to be placed. Also, in Figure 1, a test load 18 is shown in relation to the foundation 16 outline. From the position of the various test bearings and loading, it will be evident that foundation 16, no matter where it would be placed, can cover no more than three of the tested locations. Complete testing of all critical points around the foundation under present procedures would increase the cost beyond economical limits.

However, a number of tests made within the foundation limits at the sub-grade depth, or at varying depths, as work progresses, will indicate the practicability of the chosen site, or indicate a change of either site or footing design. Reliance can be placed directly upon the load readings of the device subsequently described, or comparative tests may be made between samples in the foundation against the nearest test hole or test loading. In either case a knowledge of the soil supporting strength, under actual conditions, will be obtained.

Figure 3:
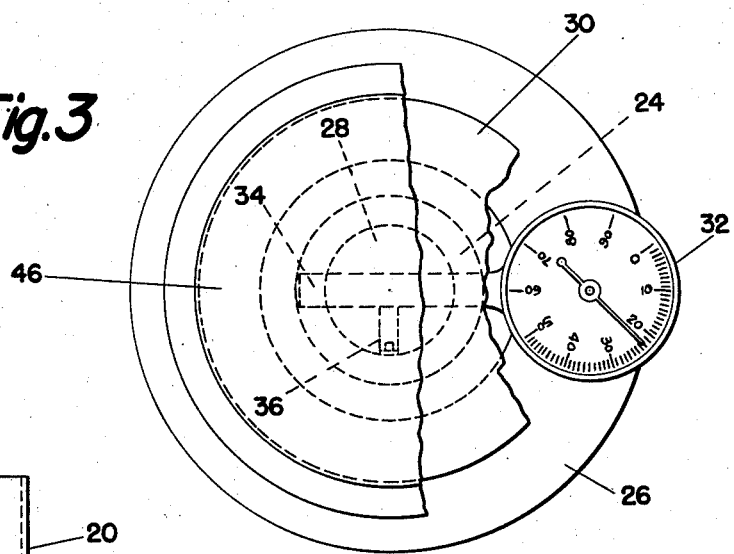
Figure 3 is a top or plan view of Figure 2.
Figure 4:
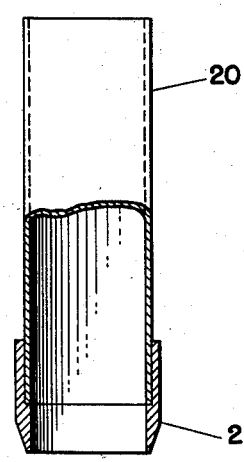
Figure 4 is an elevational view of an element of the device of Figure 2 prepared to sample the soil.

Figures 2 to 4, inclusive, illustrate the field test device of this application. A sample of earth as it exists in place is obtained by driving sleeve 20 into the ground at the selected site and strata. Shoe 21 is used as shown in Fig. 4 to facilitate this operation and help to transmit the soil sample 22 into sleeve 20 in its natural state of physical content and stress. A cylinder 24, threaded at the lower end 25 to engage a similarly threaded bottom flange 26, is enlarged internally at 27 to receive the sleeve 20. Thus the earth sample 22 occupies an area inside cylinder 24 exactly that of the internal cylinder area.

Piston 28, supporting a weight platform 30 on the upper end, is slidable in cylinder 24, and bears on the earth sample 22 in sleeve 20. Micrometer gauge 32 is mounted on piston 28 as by bracket 34 and set screw 36 and moves with the piston. A datum 38, including an adjustable table portion 40 to engage the micrometer gauge 32, a locking device 42, and a support 44 adapted to engage the bottom flange 26, completes the device. Weights 46, interchangeable and of varying sizes, are supplied to lend the necessary variable compressive force to piston 28 as it bears on sample 22.

An example, in which reference is made to all the figures of the drawing, will clarify the purpose and structure as above detailed. After the test borings and loading have been stressed and measured, general information of the area relative to the supporting strength of the soil is considered as available. Placement of the structure foundations, unless these tests have been made within the foundation limits and repeated more frequently than shown, assume continuation of the same conditions over the area to be used. It will be evident that this assumption could be in grave error in both horizontal and vertical dimensions. Use of the disclosed method and apparatus as a field check will indicate the validity of the assumption, or corrections to be made over part or all of the bearing area.

The core drills 10, 12 and 14 have established a stratification picture of the sub-soil in the general area. Additionally a general idea of the supporting strength of the soil, selected for convenience or at random, is obtained from the loaded section 18. After the foundation is excavated to sub-grade, a series of earth samples are removed and tested, in succession, for bearing strength.

By placing shoe 21 on the bottom of sleeve 20 and driving it into the sub-grade forming base for the foundation, a sample of known dimension and in-situ-characteristics is obtained. The sleeve encased sample is placed in cylinder 24, screwed into bottom flange 26, and piston 28 of contact area equal to the sample area is fitted into the cylinder. Adjustable datum means 40 is moved into contact with the micrometer gauge 32 and initial weight 46 is added.

During a selected period of time, such as 24 or 48 hours, the bearing capacity of the sample is read and recorded for variously increasing or stabilized weight conditions. During this time the sample 22 is sheltered from external atmospheric effects, retaining the natural conditions with which it will meet the loading of the structure once erected.

The information obtained can be used in several ways. A mass of data will be accumulated for each testing device, regardless of size or shape of sample and piston, which will be a guide in determining future soil bearing strengths. Secondly, the comparison method may be used, in which either laboratory tests, or better, field tests, can be considered together.

As noted above, the limitations of exact data being obtained from laboratory tests, due to lack of field conditions existing in the sample when tested, still affect the problem. Consequently, to compare the field tested specimen with the laboratory core drilled sample for that depth or specific strata would be an empirical comparison of limited value. However, it would afford strata comparisons which will be useful, and might not otherwise be available.

The alternative field test comparison, where a sample is taken adjacent the core drill boring or test rack area, at proper depth or strata, will give a more accurate and usable comparison. Care must be taken to acquire the comparison sample from undisturbed areas adjacent the test sections. Otherwise an erroneous reading will be obtained, as is evident. For the depth or strata, or both if desired, comparable to the foundation sub-grade, a test sample is taken and subjected to the unitary pressure in the device as described above. With the data acquired, comparisons can be made on which to better rest a technical decision of foundation design. A plurality of such devices can evidently be used simultaneously giving a rapid test answer to a large area at once and better reflecting the natural support strength of the soil.

What is claimed is:

1. Apparatus for testing the supporting strength of soil comprising a sleeve adapted to contain a soil sample, a cylinder for positioning the sleeve with its contained sample in testing position, said cylinder being recessed to receive the sleeve therein and having a removable bottom flange; a piston slidably mounted within the cylinder and having its lower end bearing on the soil sample in said sleeve, weight means engaging the upper end of said piston, bracket means extending from the piston and supporting a gauge means, and an adjustable datum mounted in said bottom flange, and extending into contact with the gauge means, for measuring piston movement.

2. Apparatus for testing the supporting strength of soil comprising a sleeve adapted to contain a soil sample, a cylinder for positoning the sleeve with its contained sample in testing position, said cylinder being recessed to receive the sleeve therein, a piston slidably mounted within the cylinder and having its lower end bearing on the soil sample in said sleeve, weight means engaging the upper end of said piston, and gauge means mechanically coupled to said piston for measuring piston movement.

References Cited in the file of this patent

UNITED STATES PATENTS

| 1,846,048 | Desautels | Feb. 23, 1932 |
| 2,296,466 | Dames et al. | Sept. 22, 1942 |
| 2,664,269 | Knight et al. | Dec. 29, 1953 |
| 2,709,368 | Wolpert | May 31, 1955 |
| 2,811,038 | Karol | Oct. 29, 1957 |

FOREIGN PATENTS

| 636,481 | Germany | Oct. 9, 1936 |
| 425,725 | Italy | Oct. 10, 1947 |

OTHER REFERENCES

Engineering News-Record, May 21, 1936, pages 732–734.

Soil Mechanics in Engineering Practice, by Karl Terzaghi and Ralph Peck, pp. 56 and 57, 1948, published by John Wiley and Sons.

Soil Mechanics, by C. F. Armstrong, pp. 77–94, published by Edward Arnold & Co., London, 1950.